(12) United States Patent
Prabhakar

(10) Patent No.: US 12,015,142 B2
(45) Date of Patent: Jun. 18, 2024

(54) METHODS INVOLVING USE OF NITROGEN-CONTAINING PLASMA TO TREAT LIQUID ELECTROLYTE LITHIUM-ION CATHODE MATERIALS

(71) Applicant: Venkatraman Prabhakar, Pleasanton, CA (US)

(72) Inventor: Venkatraman Prabhakar, Pleasanton, CA (US)

( * ) Notice: Subject to any disclaimer, the term of this patent is extended or adjusted under 35 U.S.C. 154(b) by 0 days.

(21) Appl. No.: 17/308,042

(22) Filed: May 4, 2021

(65) Prior Publication Data

US 2021/0343999 A1 Nov. 4, 2021

Related U.S. Application Data

(63) Continuation of application No. PCT/US2021/030533, filed on May 3, 2021.
(Continued)

(51) Int. Cl.
*H01M 4/1391* (2010.01)
*H01M 4/04* (2006.01)
*H01M 4/505* (2010.01)
*H01M 4/525* (2010.01)
*H01M 4/66* (2006.01)
*H01M 10/0525* (2010.01)
(Continued)

(52) U.S. Cl.
CPC ....... *H01M 4/1391* (2013.01); *H01M 4/0404* (2013.01); *H01M 4/0435* (2013.01); *H01M 4/0471* (2013.01); *H01M 4/505* (2013.01); *H01M 4/525* (2013.01); *H01M 4/661* (2013.01); *H01M 10/0525* (2013.01); *B05D 3/141* (2013.01); *B05D 3/145* (2013.01); *H01M 2004/028* (2013.01)

(58) Field of Classification Search
CPC ............. H01M 4/0404; H01M 4/0435; H01M 4/0471; H01M 4/1391; H01M 4/505; H01M 4/525; H01M 4/661; H01M 10/0525; B05D 3/141; B05D 3/145
USPC .................................................. 427/115, 532
See application file for complete search history.

(56) References Cited

U.S. PATENT DOCUMENTS

2014/0050656 A1* 2/2014 Kang .................... H01M 4/505
423/594.6
2014/0141355 A1* 5/2014 Huang .................. H01M 4/583
427/535
(Continued)

FOREIGN PATENT DOCUMENTS

CN 105336505 * 2/2016 ............. Y02E 60/10
EP 2706597 B 8/2016
(Continued)

OTHER PUBLICATIONS

KR-20160112767-A—Korea—Sep. 28, 2016.*
(Continued)

*Primary Examiner* — Brian K Talbot
(74) *Attorney, Agent, or Firm* — Greenberg Traurig, LLP

(57) ABSTRACT

Systems and methods related to manufacturing of Lithium-Ion cells and Lithium-Ion cell cathode materials are disclosed. In one exemplary implementation, there is provided a method of using a Nitrogen-containing plasma to treat the Lithium-Ion cell cathode materials. Moreover, the method may include treating the cathode materials before and/or after coating the cathode materials on a metal foil.

27 Claims, 9 Drawing Sheets

Related U.S. Application Data

(60) Provisional application No. 63/019,399, filed on May 3, 2020.

(51) Int. Cl.
  *B05D 3/14* (2006.01)
  *H01M 4/02* (2006.01)

(56) References Cited

U.S. PATENT DOCUMENTS

| | | | | |
|---|---|---|---|---|
| 2014/0326918 | A1* | 11/2014 | Chen | B01J 8/18 |
| | | | | 423/594.15 |
| 2016/0340772 | A1* | 11/2016 | Smith | C23C 14/08 |
| 2016/0351950 | A1* | 12/2016 | Ohuchi | H01M 4/525 |
| 2017/0301958 | A1* | 10/2017 | Deng | H01M 10/0404 |
| 2019/0051930 | A1* | 2/2019 | de Souza | H01M 4/131 |
| 2019/0207242 | A1* | 7/2019 | Lin | H01M 4/622 |
| 2019/0280305 | A1 | 9/2019 | Torita et al. | |
| 2020/0203706 | A1* | 6/2020 | Holman | H01M 4/0471 |
| 2021/0288300 | A1* | 9/2021 | Gayden | H01M 4/139 |
| 2021/0313617 | A1* | 10/2021 | Yushin | H01M 4/366 |

FOREIGN PATENT DOCUMENTS

| | | | | | |
|---|---|---|---|---|---|
| JP | 2004164934 | A | * | 6/2004 | |
| JP | 2020024947 | | * | 2/2020 | Y02E 60/10 |
| JP | 2020024947 | A | * | 2/2020 | |
| KR | 20160112767 | A | | 9/2016 | |

OTHER PUBLICATIONS

International Search Report and Written Opinion mailed Jul. 29, 2021, in counterpart Int'l application No. PCT/US2021/030533; 10 pgs total.

Machine translation of KR 20160112767A, generated from Espacenet. com, on Aug. 28, 2021; 15 pgs.

* cited by examiner

METHODS INVOLVING USE OF NITROGEN-CONTAINING PLASMA TO TREAT LIQUID ELECTROLYTE LITHIUM-ION CATHODE MATERIALS

CROSS-REFERENCE TO RELATED APPLICATIONS INFORMATION

This is a continuation (bypass) of PCT International application No. PCT/US21/30533, filed May 3, 2021, published as WO2021/225998A1, and which claims benefit and priority of U.S. provisional patent application No. 63/019,399, filed May 3, 2020, all of which are incorporated herein by reference in entirety.

BACKGROUND

The disclosed technology herein relates to the manufacture of Lithium-ion (Li-ion) cells. Li-ion cells are rechargeable batteries which store energy and can be charged and discharged. In general, the manufacture of Li-ion cells involves the cathode and anode layers and then assembling them with a separator and electrolyte in-between the cathode and anode, to form the Li-ion cell, as discussed herein and shown in FIGS. 1-2. This background discusses exemplary NMC/NCA/NMCA Li-ion cells, though aspects of the disclosed technology are not limited thereto. For such cells, the cathode material may be comprised of a powder containing Nickel, Cobalt, Manganese, Aluminum (in varying proportions). Such cathode material may also contain small amounts (<5%) of other materials, such as Magnesium, etc. This cathode material also contains lithium and oxygen and has a chemical formula such as $Li(Ni_x Mn_y Co_z Al_w)O_2$. For making the cathode electrode, the powder (also referred to as NMC powder for convenience, though typically includes NCA and NMCA with other materials) is mixed with a solvent into a slurry using a mixer, e.g., at 101 of FIG. 1, and shown via mixing machine 201 of FIG. 2. In other instances, this slurry can also be "dry" i.e. without a solvent. The slurry is then coated onto a metal foil (such as an Aluminum foil), e.g., at 102 of FIG. 1, using a coating machine 202 of FIG. 2. Following this coating step, the coated foil is dried, at 103, e.g., via a dryer, which often has multiple stages, such as stages 203, 204, 205, etc. Typically, the coating and drying are done together with a roll of foil being fed into the machine and the coated and dried foil is then re-wound at the end of dryer. After the foil is coated, the foil may be put back into the coater/dryers for coating the backside, if 2-sided coating is desired. After this the coated and dried foil is calendered at 103 e.g. via a calendering/rolling machine 206 of FIG. 2. In parallel, e.g., on another set of machines, the anode material (e.g., graphite, silicon graphite powder, etc.) is mixed into a slurry and then coated, dried and calendered. Here, the resulting anode and cathode foils may be cut into the suitable/corresponding shape(s), vacuum dried to remove moisture, and wound or along with a separator or separation layer therebetween. After stage 206, various standard machines (not shown) may be included and utilized for slitting/punching the foil into the desired size, vacuum baking it to remove moisture and then rolling it together with separator and anode. Finally, the anode, separator, cathode may then be placed in a receptacle which may then be filled with electrolyte to form the full Li-ion cell. Various known NMC cells may have different percentages of Ni, Mn, Co (such as NMC532 which has 50% Ni, 30% Manganese and 20% Cobalt). These percentages are the percentages of the cathode metals (i.e. the percentage does not include Lithium and Oxygen which are also part of the cathode material/powder). Nickel-rich (Ni-rich) cathode materials for Li-ion batteries are known to have higher energy density, e.g., greater than 150 mAh/g in certain scenarios. Here, for example, such Ni-rich cathode materials could be NMC (Ni,Mn,Co), NCA (Ni, Co, Al), NCMA (Ni, Co, Mn, Al) or similar. In general, such Ni-rich materials typically have at least 50% of the cathode metallic elements made up of Nickel. These materials could be for example NMC622 ($Ni_{0.6}Mn_{0.2}Co_{0.2}$), NMC532 ($Ni_{0.5}Mn_{0.3}Co_{0.2}$) or NMC811 ($Ni_{0.8}Mn_{0.1}Co_{0.1}$) or even higher percentages such as NCA ($Ni_{0.8}Co_{0.15}Al_{0.05}$) or NMC or NCA with greater than 90% Nickel. NCA can also be made with further reduction in cobalt and further increase in Nickel percentage. All such materials also include Li (Lithium) and Oxygen (O), as well. However, Lithium and Oxygen are not included in the percentages/atomic ratios listed above. For example, in NMC622, Nickel is 60% of the cathode metallic elements, but less than 60% of the entire cathode material, e.g., when Lithium and Oxygen are included in the percentage calculations.

Higher energy density (e.g., Wh/L or Wh/kg) tends to reduce the overall battery cost per unit energy (which is measured in $/Wh), because the energy (Wh) increases while cost of materials does not change very much. However, there are various issues which make the Nickel-rich materials difficult to manufacture and thereby increase cost(s) of manufacturing. Here, for example, among other complexities, one issue is the sensitivity of such Ni-rich materials to moisture, especially atmospheric moisture. In case of Ni-rich (e.g., greater than 50% Nickel), such as NMC cathode materials, etc., the humidity of the room needs to be kept low to avoid any degradation of the coated cathode material on the foil. While materials with lower Nickel content (<50%), can be manufactured with atmospheric relative humidity, e.g., ~30%, the materials with higher Nickel content (e.g., greater than or equal to about 50%, etc.) are sensitive to atmospheric moisture and require expensive factories and energy consumption, such as to maintain a low atmospheric humidity. Here, for example, currently environments needed for the production of Ni-rich NMC materials may specify a humidity range of 0.2% to 2%, and, typically, a humidity of around 0.5% is required to be maintained in conventional manufacturing plants.

Further, conventional approaches to incorporate nitrogen via plasma onto materials are not applicable to and otherwise would not work vis-à-vis the disclosed technology related to treating cathode materials of the types and using the process parameters herein for fabricating Li-ion cells. For instance, when exposing metal foils to nitrogen containing plasma, a high voltage is used to accelerate the ions to bombard the metal. This creates an ion bombardment zone on the surface of the metal. In contrast, the ion bombardment is not desired in the case of treating cathode materials, and could cause adverse effects, such as destroying the crystalline structure of the cathode materials. Therefore, in the present invention, there is no additional voltage applied on the cathode materials or foil to minimize any ion bombardment. Additionally, when exposing cathode powder to ammonia requires a high temperature (100 C to 400 C) as well as a very long period of time. This makes the ammonia exposure not workable for a mass-production manufacturing line. Furthermore, pure ammonia gas is much more expensive than nitrogen or other nitrogen containing gases and therefore adds significant cost to the Lithium-ion cell manufacturing. In contrast, exposing the cathode material or coated cathode foil reduce the overall manufacturing cost due to the reduced humidity requirements as stated previously in this application.

As such, as set forth below, one or more exemplary aspects of the present inventions may overcome such drawbacks and/or otherwise impart innovations consistent with the systems and methods herein via the provision of using Nitrogen-containing plasma to treat the Li-ion cathode materials during the manufacturing process for Li-ion cells.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

DETAILED DESCRIPTION OF CERTAIN ILLUSTRATIVE IMPLEMENTATIONS

Figure 1:
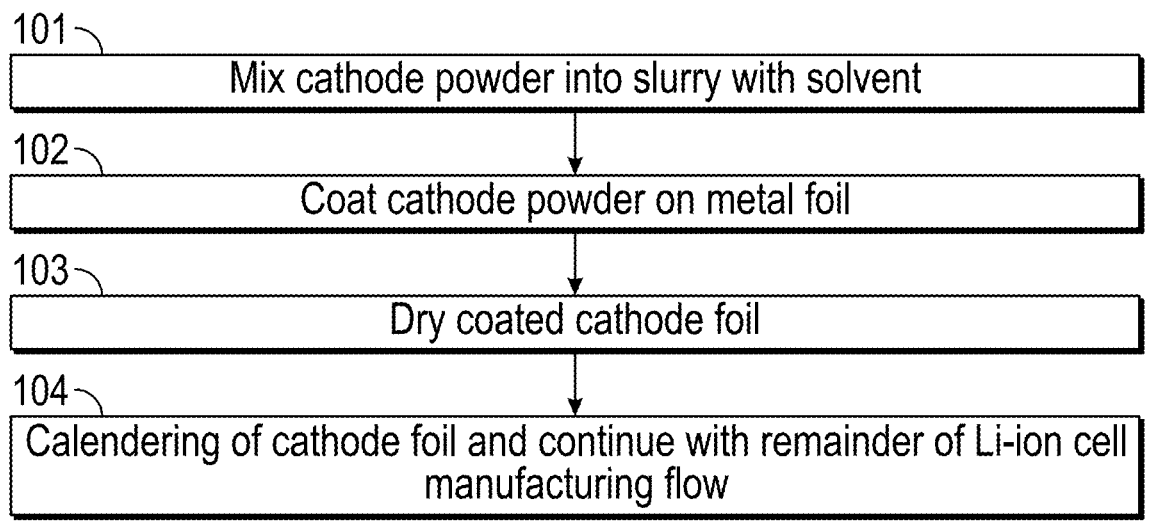
FIG. 1 is a flow diagram illustrating steps of an existing method for constructing one type of a Lithium-ion cell.
Figure 2:
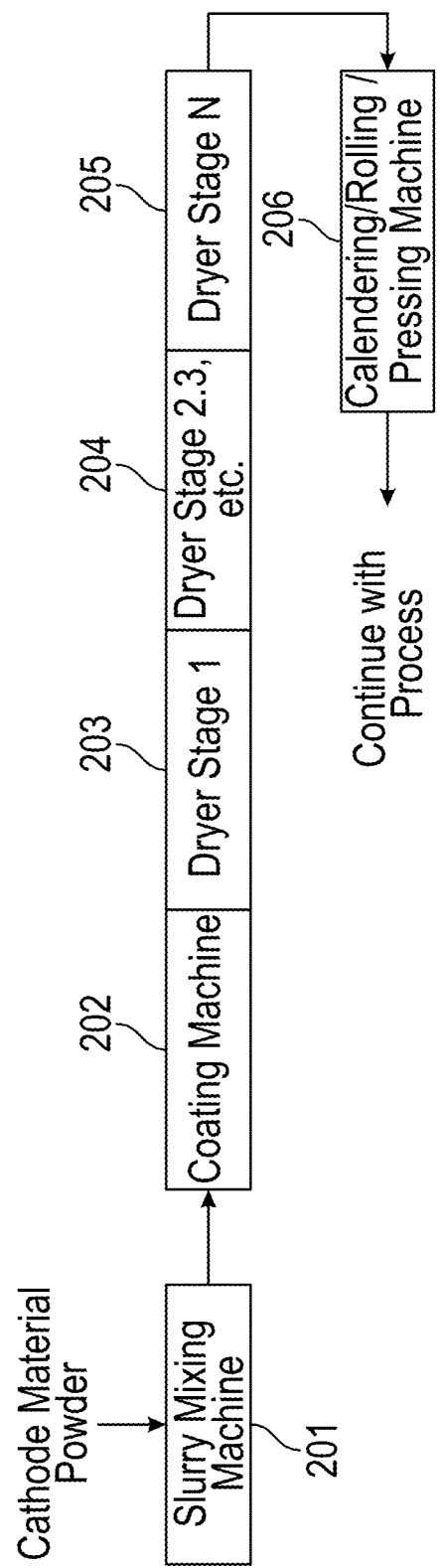
FIG. 2 is a block diagram illustrating components of an existing system used for constructing one type of a Lithium-ion cell.

Various detailed embodiments of the present disclosure, taken in conjunction with the accompanying figures, are disclosed herein. However, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

While other aspects are involved, the present disclosure focuses on the manufacturing process of the cathode for Lithium-ion cells. As explained in more detail, below, and consistent with the disclosed technology, systems and methods herein involving innovative utilization and/or incorporation of Nitrogen into Lithium-ion battery cathode materials are disclosed, such as for Nickel-rich (Ni-rich) cathodes, and the like. Further, implementations of the disclosed technology and innovations herein do not add significant costs to the manufacture of Lithium ion (Li-ion) batteries. In addition, such incorporation of nitrogen into the Ni-rich cathode materials make it less sensitive to atmospheric moisture. Accordingly, consistent with aspects herein, the overall cost of building and operating Lithium-ion cell factories using the Nickel-rich (e.g., greater than or equal to 50% Nickel, as atomic ratio of cathode metallic elements) cathode materials is reduced. Further, unlike other existing methods of incorporating nitrogen (see, e.g., Background), systems and methods involving the plasma exposure components/features disclosed herein take a much shorter period of time to complete and can easily be incorporated into the Li-ion cell manufacturing flow.

Turning to implementations herein, one example of cathode materials consistent with the disclosed technology may be NMC532 ($Ni_{0.5}Mn_{0.3}Co_{0.2}$). Here, in such example(s), while the full composition of the cathode material is approximately denoted as Li ($Ni_{0.5}Mn_{0.3}Co_{0.2}$)$O_2$, typically only the active cathode material composition (NMC532) is used to denote the cathode material composition. In the rest of this invention disclosure, such shorthand notations for Li-ion cell cathode materials will be adopted. For this particular composition, i.e., NMC532, the Nickel (Ni) forms 50% of the active cathode material and Manganese (Mn) forms 30% of the active cathode material and Cobalt (Co) forms 20% of the active cathode material. Other materials with higher Nickel composition are also within the scope of the disclosed technology, including but not limited to NMC622 ($Ni_{0.6}Mn_{0.2}Co_{0.2}$), with 60% Nickel composition of the active cathode material, NMC811 ($Ni_{0.8}Mn_{0.1}Co_{0.1}$), as well as LNO (Lithium Nickel Oxide) with greater than 95% Nickel composition of the active cathode materials. Further, other materials with higher Nickel composition are also within the scope of the disclosed technology, including, e.g., NCA ($Ni_{0.8}Co_{0.15}Al_{0.05}$) as well as NCA materials with even higher Nickel composition than 80%, such as NCMA (Ni—Co—Mn—Al), etc.

Figure 3:
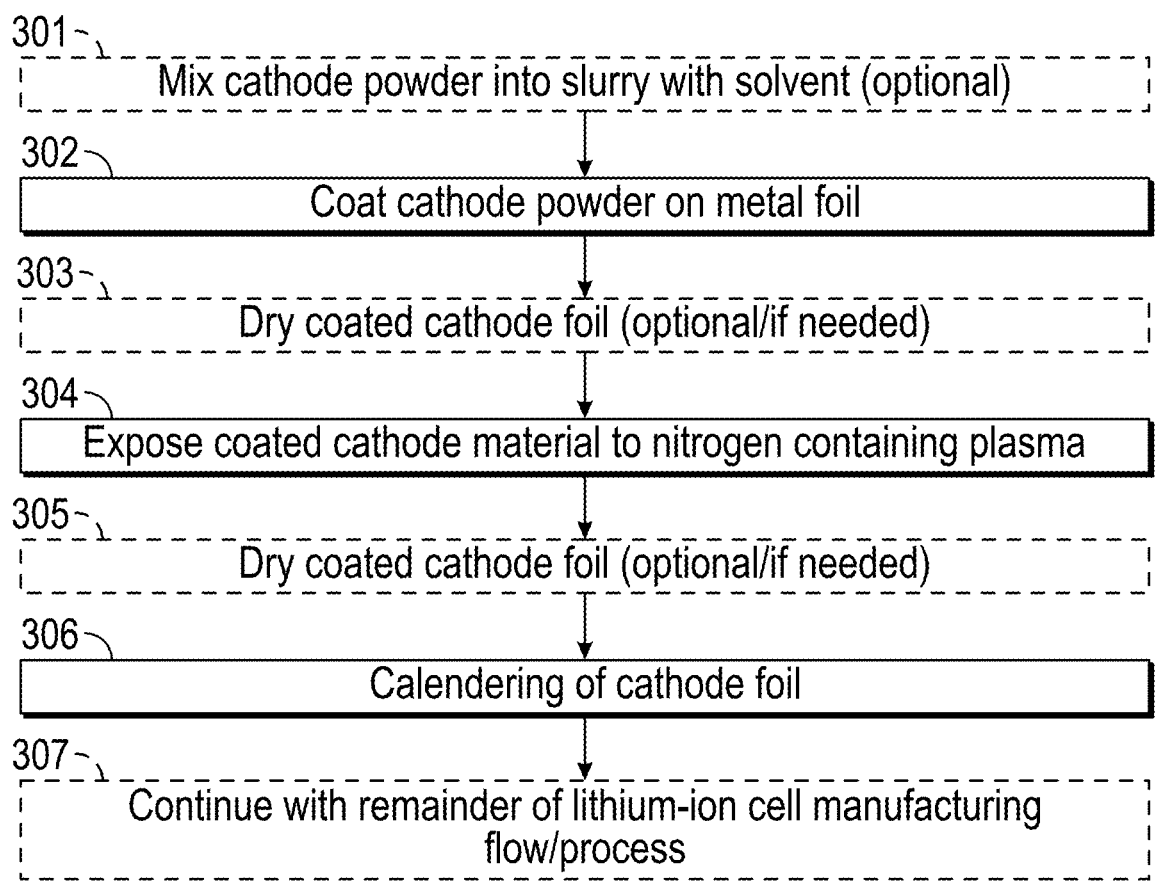
FIG. 3 is a flow diagram illustrating steps of an exemplary method for constructing a Lithium-ion cell, consistent with exemplary aspects of certain embodiments of the disclosed technology.

Referring next to FIG. 3, a flow diagram illustrating steps of one exemplary method associated with aspects of constructing a Lithium-ion cell, consistent with exemplary aspects of certain embodiments of the disclosed technology, is shown. In a first illustrative embodiment of FIG. 3, an exemplary method of exposing or treating the cathode material with a nitrogen-containing plasma, e.g., after coating the cathode material on the electrode is disclosed.

Referring to FIG. 3, the method may include, in certain embodiments (e.g., in solvent-based or wet processes) a step of mixing the cathode powder into a slurry via a solvent, at 301. In other embodiments, the cathode powder may be coated on to the foil in a dry fashion without the solvent. Next, a step of coating the cathode powder onto a foil may be performed, at 302. Here, for example, such metal foil may comprise an Aluminum foil or include Aluminum, and this step may be performed with a roll-to-roll process where a roll is fed through a coating machine. After this coating step, a first step of drying the coated cathode foil may be performed (if needed), at 303. Such drying of the coated cathode foil may be done in a standard way, e.g., before or after the plasma treatment at 304. Here, for example, the metal foil may be fed through the dryers to evaporate the solvent, or other known techniques for drying the foil may be utilized.

Next, the step of exposing or treating the coated cathode foil to a nitrogen-containing plasma may be performed, at 304. Here, in step 304, the plasma source gas may be any nitrogen-containing gas or gases. According to embodiments herein, such Nitrogen-containing gas could be or include $N_2$ or $NH_3$ or $NF_3$ or $NO$ or $N_2O$ or other nitrogen containing gases. Other gases such as air or oxygen could also be mixed with the nitrogen containing gases for the plasma. In some implementations, for example, this plasma could be pure $N_2$ or combination of $N_2/O_2$ in any percentage including air (e.g., approximately 80% $N_2$, approximately 20% $O_2$, or the like). Other gases, such as $NH_3$ (ammonia), $NF_3$, or a combination of gases such as $N_2/NF_3$ or $N_2/NH_3$ or $N_2/O_2/NH_3$ or $N_2/O_2/NF_3$ can be used as the nitrogen source gas for the plasma treatment. In an alternative embodiment, a multi-step plasma treatment process can be employed. For example, one step with $N_2/O_2$ could be used, followed by another step with $N_2/NF_3$ or $N_2/NH_3$. This is only an example of a multi-step process, but many other multi-step plasma treatment combinations are possible. According to various embodiments herein, the plasma frequency may be between about 13 MHz to about 5000 MHz (i.e. 5 GHz). Further, in some embodiments, the plasma may be set in a more narrow range of frequency, such as between about 800 MHz to about 2500 MHz (i.e. 2.5 GHz). Further, in some even more specific embodiments, plasma frequencies such as 915 MHz or 2450 MHz may be utilized.

After the treatment with the nitrogen-containing plasma, at 304, one or more optional steps of (further) drying the coated cathode foil may be performed, at 305. After such stages, an optional step of cooling down the foil may be employed. Next, a step of calendering or winding the cathode foil may be performed, at 306, and, notably, this step of calendering may be done at normal atmospheric or room conditions, i.e., without certain special environmental (gas or air) requirements or restrictions that are otherwise needed for existing technologies. Moreover, in some embodiments, the cathode foil may be wound or otherwise bundled with the other layers of the Li-ion cell at or after such stage. In particular, throughout such steps of processing the foil, advantageously, the humidity (relative humidity) of room air, when utilizing the present innovations, may range from about 5% to about 35%. More specifically, the humidity can be controlled between about 10% to about 30%, and, further, in some specific embodiments, between about 20% and about 30%. Such humidity levels are significantly higher than the requirements of existing techniques, and thus reduce the technical requirements, complexities and/or costs of manufacture of Li-ion cells. Finally, one or more additional steps may be performed, at 307, in continuing with various additional, known Lithium-ion cell manufacturing process steps, as per the standard processes used by Li-ion cell manufacturers.

Figure 4:
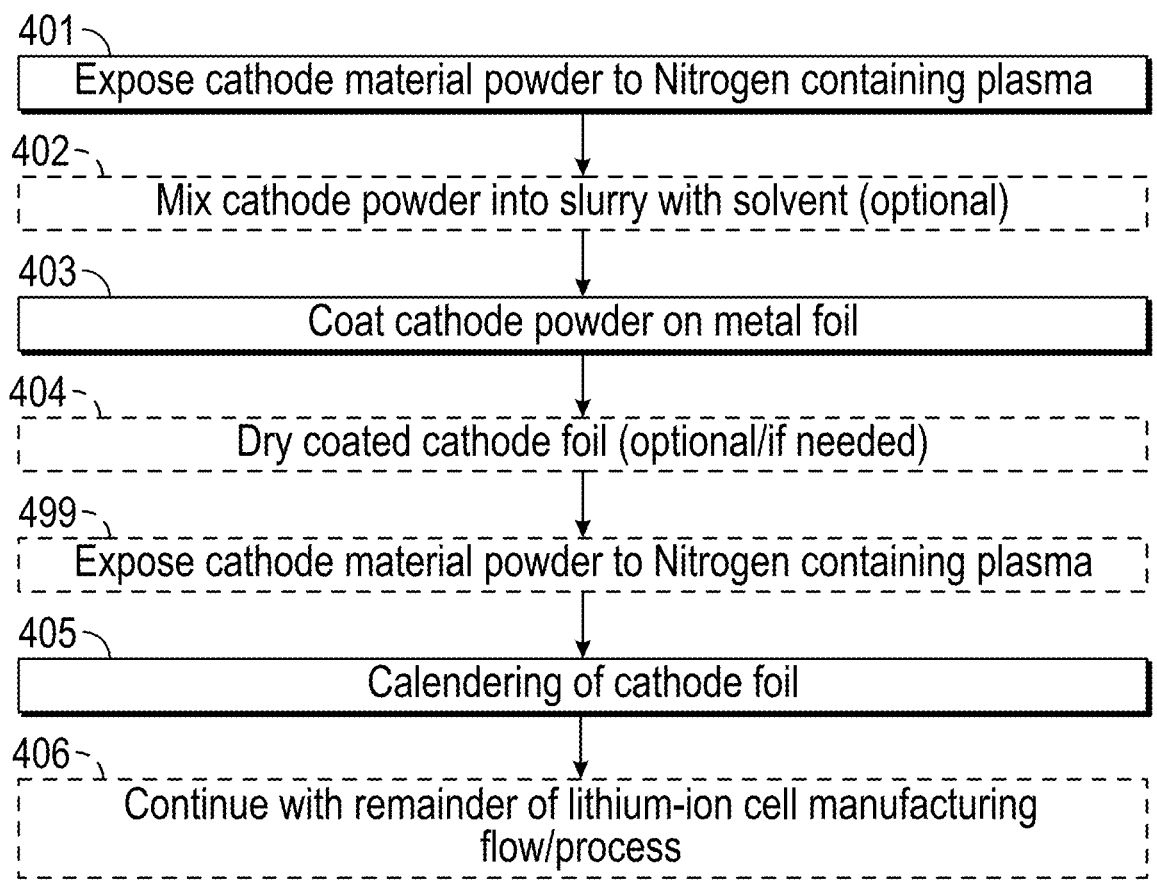
FIG. 4 is a flow diagram illustrating steps of another exemplary method for constructing a Lithium-ion cell, consistent with exemplary aspects of certain embodiments of the disclosed technology.

FIG. 4 is a flow diagram illustrating steps of another exemplary method for constructing a Lithium-ion cell, consistent with exemplary aspects of certain embodiments of the disclosed technology. In the embodiment of FIG. 4, the cathode powder is treated with nitrogen containing plasma before coating on to the metal foil. Referring to FIG. 4, this step treating the cathode powder with a nitrogen-containing plasma is shown first, at 401. Here, as previously mentioned, the source gas for this nitrogen containing plasma can be pure $N_2$ or combination of $N_2/O_2$ in any percentage including air (~80% $N_2$, 20% $O_2$). Other gases, such as $NH_3$ (ammonia), $NF_3$, or a combination of gases such as $N_2/NF_3$ or $N_2/NH_3$ or $N_2/O_2/NH_3$ or $N_2/O_2/NF_3$ can be used as the nitrogen source gas for the plasma treatment of this embodiment. Following this step of treating the cathode material with nitrogen-containing plasma, at 401, various other additional steps consistent with or similar to the embodiment of FIG. 3 may be performed. As shown in FIG. 4, for example, various further steps may be performed, such as: an optional step of mixing the cathode powder into a slurry with a solvent, at 402, coating the cathode powder onto a metal foil, at 403; another optional step of drying the coated cathode foil (in some embodiments/if needed), at 404; calendering of the cathode foil, at 405; as well as one or more additional steps of continuing with the remaining, standard Lithium-ion cell manufacturing process, at 406.

Moreover, as also shown in FIG. 4, in some further hybrid models of both above embodiments, systems and methods herein may be implemented in a manner wherein the cathode powder may initially be treated with the nitrogen-containing plasma, at 401, while also including an additional step of treating the coated cathode material with the nitrogen-containing plasma, again, e.g., after it has been coated onto the metal foil, i.e., at step 499 in FIG. 4.

In step 401 of FIG. 4, the cathode powder is exposed to the plasma including nitrogen-containing gases. Here, again, such Nitrogen containing gas may be or include $N_2$ or $NH_3$ or $NF_3$ or $NO$ or $N_2O$ or other nitrogen containing gases. Other gases such as air or oxygen could also be mixed with the nitrogen containing gases for the plasma. Further, as with the prior embodiment, the plasma frequency can be between about 13 MHz to about 5000 MHz (i.e. 5 GHz), or between about 800 MHz to about 2500 MHz (i.e. 2.5 GHz), or, in some specific implementations, plasma frequencies such as 915 MHz or 2450 MHz may be utilized.

Overall, as similar with the embodiment of FIG. 3, after the drying step 404, the foil is calendered without need for the specialized environment(s) needed for existing techniques, i.e., it may be rolled in normal room air conditions. Further, as with the embodiment of FIG. 3, the relative humidity of the room in the present invention can range from about 5% to about 35%, or between about 10% and about 30%, or, in some implementations, between about 20% and about 30%.

Figure 5:
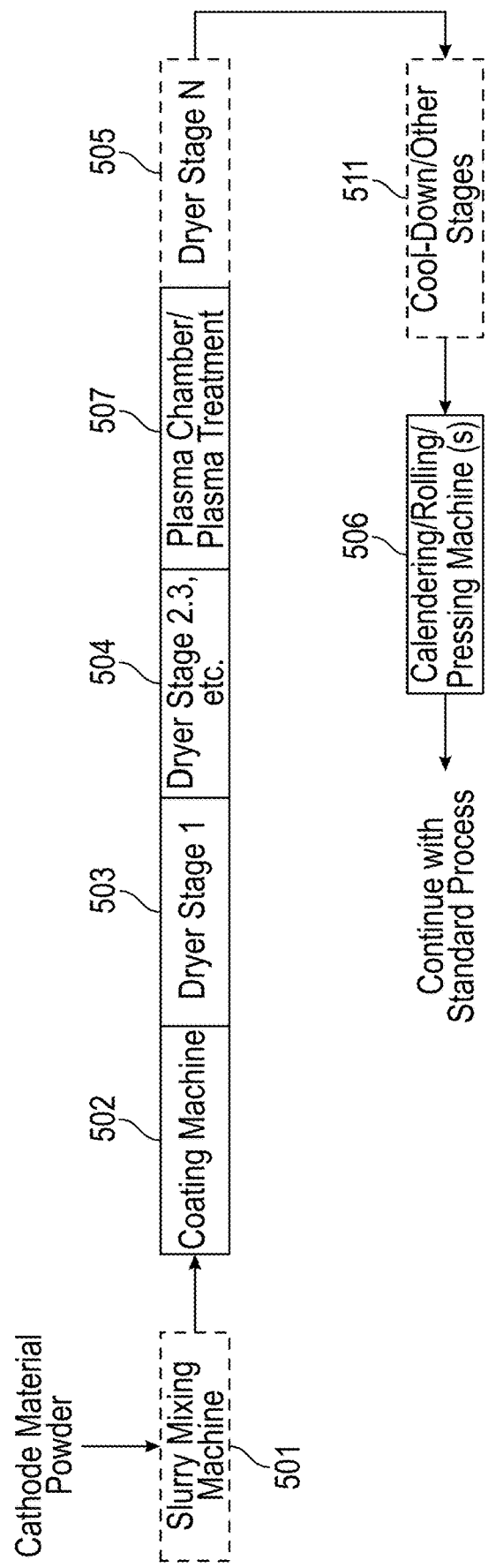
FIG. 5 is a block diagram illustrating components of an exemplary system used for constructing Lithium-ion cells, consistent with exemplary aspects of certain embodiments of the disclosed technology.

FIG. 5 is a block diagram illustrating components of an exemplary system used for constructing Lithium-ion cells, consistent with exemplary aspects of certain embodiments of the disclosed technology. Referring to FIG. 5, the cathode powder (along with solvent and other constituents such as binder, carbon, etc.) is/are fed into the mixer 501 or mixing machine 501 to form the slurry. The slurry is then fed into coating machine 502 either by automatic feed or by manual feed. The coating is done typically done by feeding a metal (e.g. Aluminum, etc.) foil into the coating machine 502 using, for example, roll-to-roll processing. As the foil is fed through the coating machine 502, the cathode slurry is coated on the foil by using any of the well-known methods such as slot-die, extrusion, gravure, etc. After coating, the foil continues to be fed into dryers or drying stages, e.g., such as first dryers 503 and 504. Although only 2 dryer stages are shown in FIG. 5, it is understood the that the dryer stages can vary both in length and number of stages depending on the process requirements, slurry composition, and the like. In some embodiments, such dryer stages 503, 504 may have heaters and a solvent exhaust collection and recovery system (not shown). According to the exemplary embodiment illustrated in FIG. 5, a last dryer stage 504 is followed by the plasma chamber 507, which exposes the coated cathode material to the plasma which contains the nitrogen gas. As set forth above, such Nitrogen-containing gas may be or include $N_2$ or $NH_3$ or $NF_3$ or NO or $N_2O$ or other nitrogen containing gases. Other gases such as air or oxygen could also be mixed with the nitrogen containing gases for the plasma. As also indicated, above, the plasma frequency may be between about 13 MHz to about 5000 MHz (i.e. 5 GHz), or between about 800 MHz to about 2500 MHz (i.e. 2.5 GHz), or, in some implementations, may be a specific frequency such as 915 MHz or 2450 MHz. While this particular embodiment shows some drying stages before the plasma chamber, in other embodiments, the plasma chambers could be placed first and the dryer stages afterwards. After plasma chamber 507, one or more optional dryer stage(s) 505 (which may also include, or instead be, a cool-down stage 511 without any heaters, e.g., in alternative embodiments). Once the foil passes through all the dryer stages and plasma chamber, it may then be rewound, i.e. at a stage between 505 and 506 or at a stage between 511 and 506, without the environmental restrictions of existing technologies, i.e., even in room air. After such rewinding, in some embodiments, the foil may be sent back in through various same and/or differing coating, dryer, and/or plasma stages to coat the backside of the foil with cathode material, i.e., for dual-sided coating when that is desired. After such steps and stages, the foil is fed through the calendering/rolling machine 506 where the cathode materials is pressed between rollers or similarly processed. After the calendering machine 506, the cathode foil or resulting material goes through other or additional standard processes, including slitting/punching machines to get the right size and then it is wound together with the separator and anode followed by putting into cans or containers, followed by filling or addition of the electrolyte to make the Li-ion cell.

Figure 6:
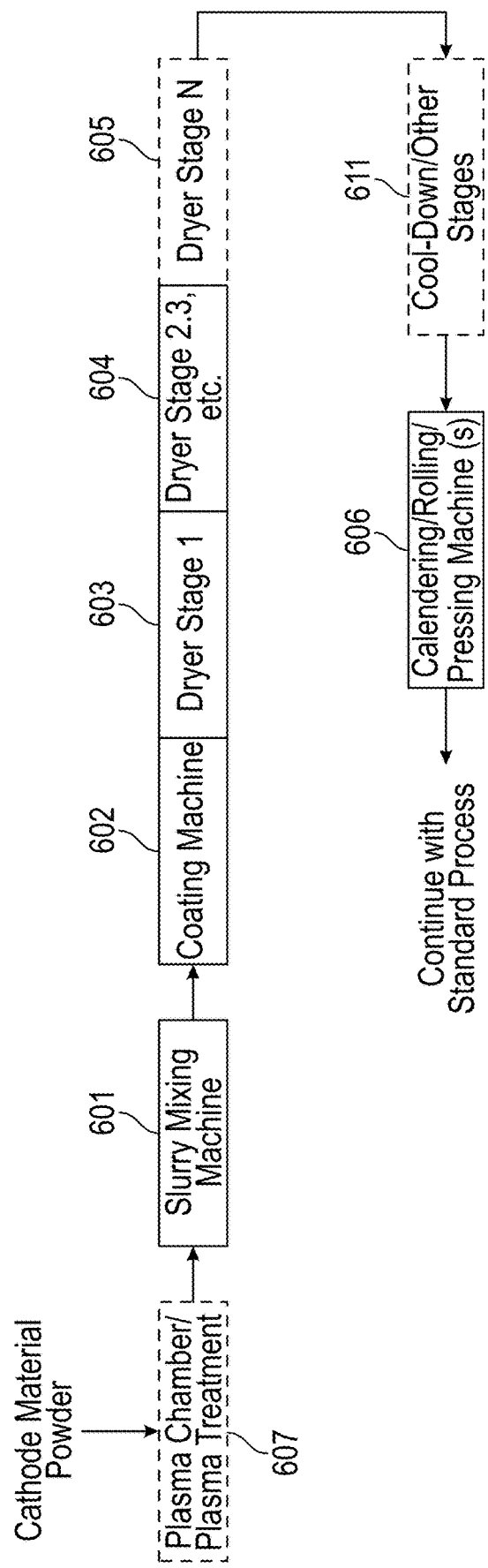
FIG. 6 is a block diagram illustrating components of another exemplary system used for constructing Lithium-ion cells, consistent with exemplary aspects of certain embodiments of the disclosed technology.

FIG. 6 is a block diagram illustrating components of another exemplary system used for constructing Lithium-ion cells, consistent with exemplary aspects of certain embodiments of the disclosed technology. FIG. 6 illustrates an alternative embodiment of the disclosed technology, though wherein the cathode powder or base material is first treated with the Nitrogen-containing plasma, in a plasma chamber 607, prior to undergoing various other processing set forth in more detail, above. Referring to FIG. 6, the cathode material powder is first treated in the plasma chamber 607. Following this step/stage, the treated cathode material is fed into the mixer/slurry making machine 601. Here, at the slurry mixing machine 601, the slurry is formulated with the cathode material along with solvent, carbon, binder etc. This slurry is then fed into the coating machine 602, either manually or automatically, and then coated on the metal (e.g., Aluminum, etc.) foil in the coating machine 602. Once coated, the roll of coated metal foil continues on into the dryer stages 603, 604, 605. Although three (3) dryer stages are shown in FIG. 6, it is to be understood that the number of dryer stages may be fewer (even zero) or more, depending on the foil speed and other requirements of the slurry. The foil with the coated and dried cathode material is then fed into calendering/rolling machine 606. Optionally, in some embodiments, the foil may be cooled down in a cool-down stage 611 after the dryer stages. Optionally, in some embodiments, the backside of the foil could be coated, and (optionally) dried, and calendered in the same or similar fashion. According to various embodiments, the calendering may be performed on both sides, together (i.e. after the backside is coated and dried), or it may be performed in 2 calendering steps (once each for each side coating).

Figure 7A:
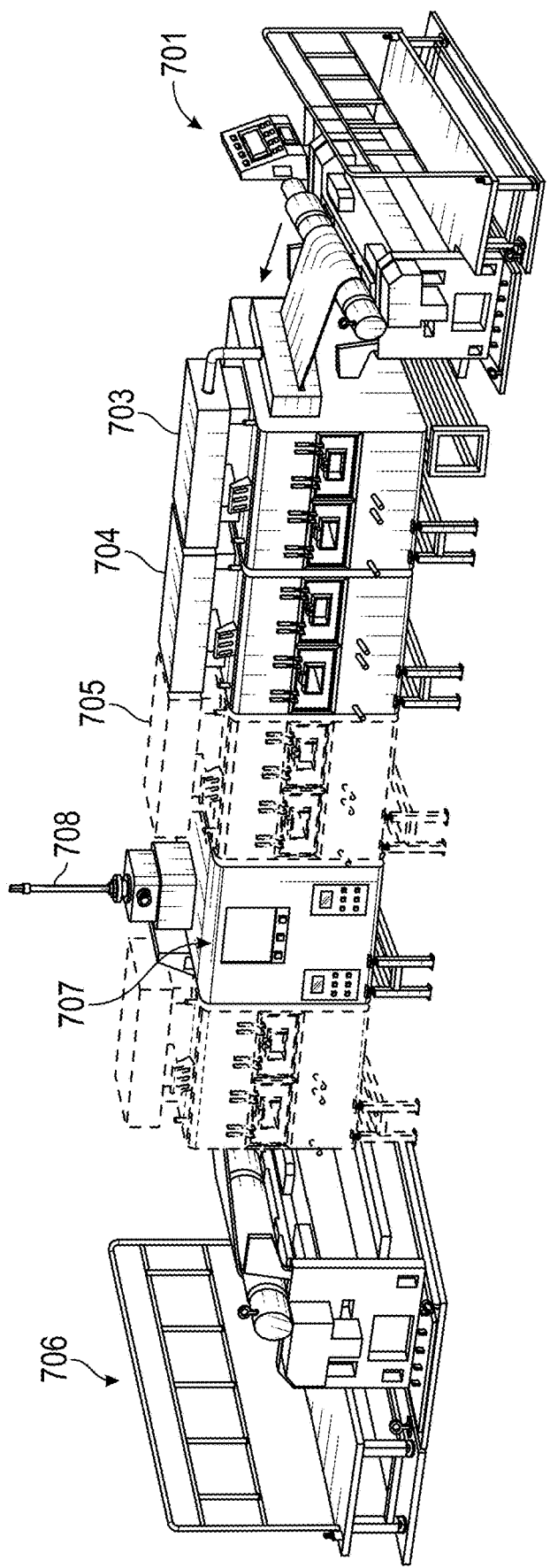
FIG. 7A is a diagram illustrating aspects of an exemplary system used for constructing Lithium-ion cells related to the block diagram of FIG. 5, consistent with exemplary aspects of certain embodiments of the disclosed technology.

FIG. 7A is a diagram illustrating aspects of an exemplary system used for constructing Lithium-ion cells related to the block diagram of FIG. 5, consistent with exemplary aspects of certain embodiments of the disclosed technology. Referring to FIG. 7A, foil coated with the cathode slurry (obtained as set forth above) is fed, typically from a roller 701, into dryers or drying stages, e.g., such as drying stages 703, 704, 705, etc., corresponding to the dryers 503, 504 set forth in FIG. 5. Although a set number of such drying stages are shown in FIG. 7A, it is understood the that the dryer stages can vary both in length and number of stages depending on the process requirements, slurry composition, and the like. Upon leaving the last dryer stage 705, the coated foil is fed into the plasma chamber 707, fed by plasma source 708, for the exposure/treatment via the Nitrogen-containing plasma, as explained in detail elsewhere herein. While this embodiment of FIG. 7A shows some drying stages 703-705 before the plasma chamber 707, in other embodiments, the plasma chambers could be placed first and the dryer stages afterwards. After plasma chamber 707, one or more optional dryer stage(s) 709 (which may also include, or instead be, a cool-down stage without any heaters, e.g., in alternative embodiments). Once the foil passes through all the dryer stages and plasma chamber, it may then be rewound, at 706, without the environmental restrictions of existing technologies, i.e., even in room air. After such rewinding, in some embodiments, the foil may be sent back in through various same and/or differing coating, dryer, and/or plasma stages to coat the backside of the foil with cathode material, i.e., for dual-sided coating when that is desired. Further, the foil may be fed through various calendering/rolling machines or processes and/or other or additional standard processes, as set forth above or otherwise known in the art.

Figure 7B:
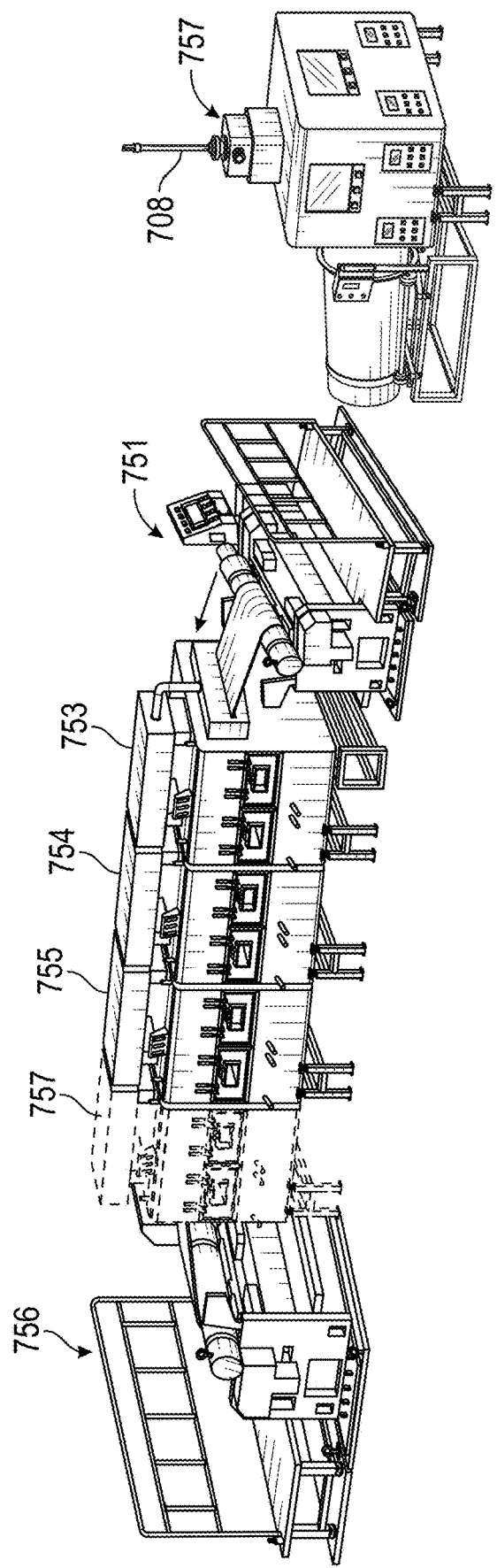
FIG. 7B is a diagram illustrating aspects of another exemplary system used for constructing Lithium-ion cells related to the block diagram of FIG. 6, consistent with exemplary aspects of certain embodiments of the disclosed technology.

FIG. 7B is a diagram illustrating aspects of another exemplary system used for constructing Lithium-ion cells related to the block diagram of FIG. 6, consistent with exemplary aspects of certain embodiments of the disclosed technology. Referring to FIG. 7B, a Lithium-ion cell fabrication system is shown comprising an initial plasma chamber 757, which may have an external plasma source 708, in some embodiments. Further, once the cathode powder or material is treated by the Nitrogen-containing plasma, at the plasma chamber 757, as set forth in more detail in connection with FIG. 6, above, such cathode powder or material may be slurried and/or otherwise placed onto the foil, and then processed through a series of rollers 751, 756, drying stages 753, 754, 755, 75n, as well as other optional stages as set forth in FIG. 6 and elsewhere herein.

Figure 8:
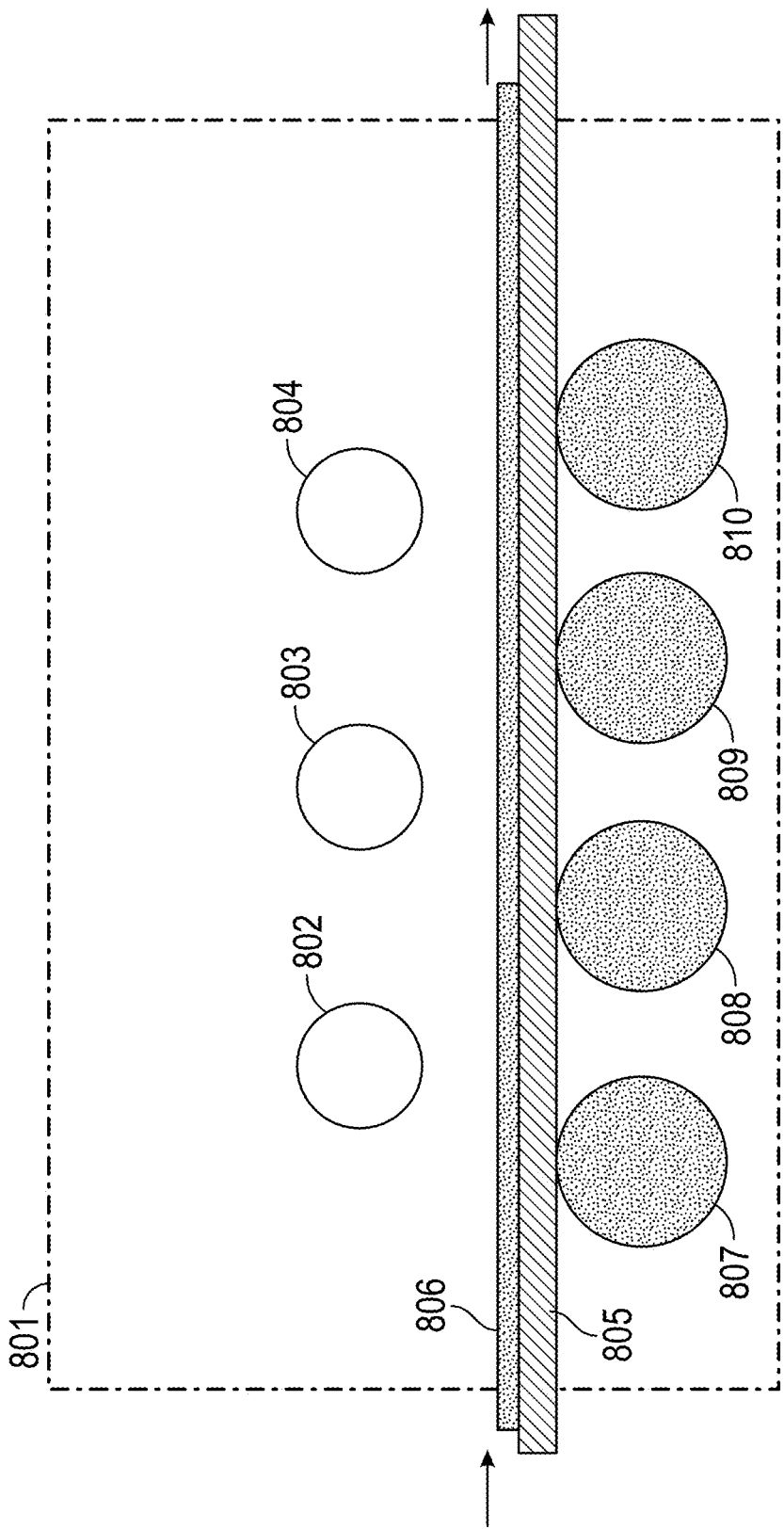
FIG. 8 is a diagram illustrating components and aspects of an exemplary plasma chamber of an exemplary system used for constructing Lithium-ion cells, consistent with exemplary aspects of certain embodiments of the disclosed technology.

FIG. 8 is a diagram illustrating components and aspects of an exemplary plasma chamber 801 of an exemplary system used for constructing Lithium-ion cells, consistent with exemplary aspects of certain embodiments of the disclosed technology. Referring to FIG. 8, in some aspects of the disclosed technology, such exemplary plasma chamber 801 may be utilized as the plasma chamber(s) shown and described in FIG. 5. According to some embodiments, such plasma chamber 801 may be configured to allow roll-to-roll processing in order to facilitate production. The example embodiment of FIG. 8 shows the metal foil 805 with the coated cathode material 806 moving through the chamber from left to right. The rollers 807, 808, 809, 810 allow the foil to move smoothly. The number of rollers can be adjusted to lower or higher numbers to allow the foil to move appropriately through the plasma chamber without wrinkling or creases. Further, in this illustrative embodiment, exemplary plasma sources are shown as 802, 803 and 804. According to various embodiments of the disclosed technology, the quantity and position(s) of such sources 802, 803, 804 may be adjusted in various ways to uniformly or suitably expose the coated cathode layer 806 to the plasma. According to the disclosed technology, the plasma frequency or frequency range or ranges may be as set forth above. Similarly, in some aspects, the Nitrogen-containing gases may be as set forth above, e.g., they may include a combination of Nitrogen and Air (which has mostly $N_2/O_2$). In other embodiments, gases such as $NH_3$ (ammonia), $NF_3$ (Nitrogen Trifluoride), $N_2O$ (Nitrous oxide), NO (Nitric oxide) may be utilized and/or included. In still other embodiments combinations of gases such as $N_2/O_2/NF_3$ can be used for the plasma exposure. In some embodiments, the plasma source may be a remote plasma source, so that the source may be outside the chamber and the radicals generated by the plasma may be fed into the plasma exposure chamber. In other embodiments, the plasma may be generated as a low pressure (e.g., less than 0.5 atm, etc.) plasma source. In still other embodiments, an atmospheric pressure plasma source may be used with a pressure between 0.5 and 1.5 atmospheres, or in one or more specific embodiments, at or about 1 atmosphere pressure.

Various embodiments may be configured such that cathode active materials/metals of different compositions are utilized to coat metal foils. For example, such cathode active material may comprise, substantially comprise or consist of NMC532 ($Ni_{0.5}Mn_{0.3}Co_{0.2}$). In another example, cathode active materials may comprise, substantially comprise or consist of NMC622 ($Ni_{0.6}Mn_{0.2}Co_{0.2}$). In yet another example, cathode active materials may comprise, substantially comprise or consist of NMC811 ($Ni_{0.8}Mn_{0.1}Co_{0.1}$). In still yet another example, cathode active materials may comprise, substantially comprise or consist of LNO (Lithium Nickel Oxide with Nickel >90%). In another example, cathode active materials may comprise, substantially comprise or consist of NCA ($Ni_{0.8}Co_{0.15}Al_{0.05}$) or with NCA with Nickel concentration above 0.8. In yet another example, cathode active materials may comprise, substantially comprise or consist of NMCA, with Nickel, Manganese, Cobalt and Aluminum. In one example, cathode active materials may comprise, substantially comprise or consist of Magnesium at a concentration of less than about 3%, or less than 3%.

Various embodiments may be also configured such that nitrogen containing gas of different composition are utilized to treat coated metal foils and/or cathode powder. For example, such nitrogen containing gas may comprise, substantially comprise, or consists of N2. In another example, the nitrogen containing gas may comprise, substantially comprise, or consists of NH3 (Ammonia). In yet another example, the nitrogen containing gas may comprise, substantially comprise, or consists of one or both of N2 and/or O2, or of N2 and O2. In still yet another example, the nitrogen containing gas may comprise, substantially comprise, or consists of NF3 (Nitrogen trifluoride). In another example, the nitrogen containing gas may comprise, substantially comprise, or consists of a combination of N2/O2 or air or N2/NF3 or N2/NF3/O2 or N2/NH3 or N2/NH3/O2.

In various embodiments, the plasma may be generated via any suitable technique. For example, the plasma may be generated using a remote plasma source. For another example, the plasma may be generated using a low-pressure plasma source. For yet another example, the plasma may be generated using a near-atmospheric pressure (e.g., ranging from about 0.5 to about 1.5 atmospheres pressure) plasma source.

Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Other implementations of the inventions will be apparent to those skilled in the art from consideration of the specification and practice of the innovations disclosed herein. It is intended that the specification and examples be considered as exemplary only, with a true scope and spirit of the inventions being indicated by the present disclosure and claims and various associated principles of related patent doctrine.

The invention claimed is:

1. A method of fabricating a Lithium-ion cell, the method comprising:
   coating a cathode powder on a metal foil to produce a cathode-coated metal foil;
      wherein the cathode powder comprises one or more cathode active materials;
      wherein the cathode powder contains Lithium, Nickel, and Oxygen and the one or more cathode active materials have a chemical formula of $Li(Ni_xMn_yCo_zAl_w)O_2$, wherein $0.6 \leq x \leq 0.95$, $0.02 \leq y \leq 0.2$, $0 \leq z \leq 0.2$, $0 \leq w \leq 0.1$, and the Lithium is not lithium excess;
   drying, by one or more dryer chambers, the cathode-coated metal foil, wherein each of the one or more dryer chambers is configured with a header, a solvent exhaust collection and a recovery system;
   exposing, by at least one plasma chamber, the cathode-coated metal foil with treating material comprising nitrogen containing plasma having a nitrogen-containing reactive gas that reacts with the one or more cathode active materials to incorporate Nitrogen into the Lithium-ion cell's cathode, wherein the plasma is a near-atmospheric pressure plasma source ranging from about 0.5 to about 1.5 atmospheres pressure;
   calendering or rolling the cathode-coated metal foil treated to incorporate the Nitrogen; and
   placing the cathode-coated foil, treated to incorporate the Nitrogen, in a receptacle with a liquid electrolyte, to yield the Lithium-ion cell.

2. The method of claim 1 wherein the nitrogen-containing reactive gas consists essentially of $N_2$.

3. The method of claim 1 wherein the nitrogen-containing reactive gas consists essentially of $NH_3$.

4. The method of claim 1 wherein the nitrogen-containing reactive gas comprises one or more of $N_2/O_2$, air, $N_2/NF_3$, $N_2/NF_3/O_2$, $N_2/NH_3$, and/or $N_2/NH_3/O_2$.

5. The method of claim 1 wherein $x=0.6$, $y=0.2$, $z=0.2$, and $w=0$.

6. The method of claim 1 wherein $x=0.8$, $y=0.1$, $z=0.1$, and $w=0$.

7. The method of claim 1 wherein $0.9<x\le0.95$, $0.02\le y\le0.1$, $0\le z\le0.1$, and $w=0$.

8. The method of claim 1 wherein $0.6\le x\le0.95$, $0.02\le y\le0.2$, $0\le z\le0.2$, and $0<w\le0.1$.

9. The method of claim 1 wherein the nitrogen-containing reactive gas comprises $N_2/O_2$.

10. The method of claim 9 wherein $x=0.6$, $y=0.2$, $z=0.2$, and $w=0$.

11. The method of claim 9 wherein $x=0.8$, $y=0.1$, $z=0.1$, and $w=0$.

12. The method of claim 9 wherein $0.9<x\le0.95$, $0.02\le y\le0.1$, $0\le z\le0.1$, and $w=0$.

13. The method of claim 9 wherein $0.6\le x\le0.95$, $0.02\le y\le0.2$, $0\le z\le0.2$, and $0<w\le0.1$.

14. The method of claim 11, wherein the nitrogen-containing reactive gas consists essentially of $N_2/O_2$.

15. The method of claim 1 wherein the cathode powder is applied onto the metal foil as a slurry that fills regions of the metal foil.

16. The method of claim 15, wherein the nitrogen-containing reactive gas consists essentially of $N_2$.

17. The method of claim 16, wherein $x=0.8$, $y=0.1$, $z=0.1$, and $w=0$.

18. The method of claim 1 further comprising:
mixing the cathode powder to form a slurry that is coated on the metal foil to produce the cathode-coated metal foil.

19. The method of claim 9 wherein the cathode powder is applied onto the metal foil as a slurry that fills regions of the metal foil.

20. The method of claim 19 wherein $x=0.8$, $y=0.1$, $z=0.1$, and $w=0$.

21. The method of claim 19 wherein $0.6\le x\le0.95$, $0.02\le y\le0.2$, $0\le z\le0.2$, and $0<w\le0.1$.

22. The method of claim 9 further comprising:
mixing the cathode powder to form a slurry that is coated on the metal foil to produce the cathode-coated metal foil.

23. The method of claim 22 wherein $x=0.8$, $y=0.1$, $z=0.1$, and $w=0$.

24. The method of claim 22 wherein $0.6\le x\le0.95$, $0.02\le y\le0.2$, $0\le z\le0.2$, and $0<w\le0.1$.

25. The method of claim 1, wherein the nitrogen-containing reactive gas consists essentially of $N_2/O_2$.

26. The method of claim 25, wherein the cathode powder is applied onto the metal foil as a slurry that fills regions of the metal foil.

27. The method of claim 25, further comprising:
mixing the cathode powder to form a slurry that is coated on the metal foil to produce the cathode-coated metal foil.

* * * * *